July 21, 1953  F. W. VODOZ  2,646,158
BARN CLEANER
Filed Aug. 18, 1947  7 Sheets-Sheet 1

Fred W. Vodoz
INVENTOR

BY
ATTORNEY

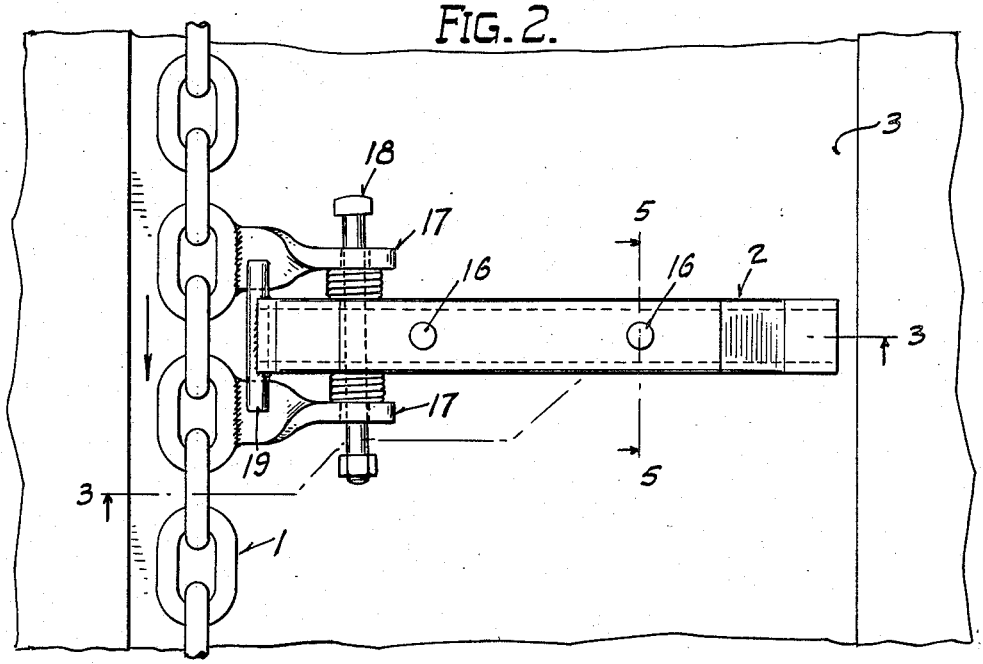
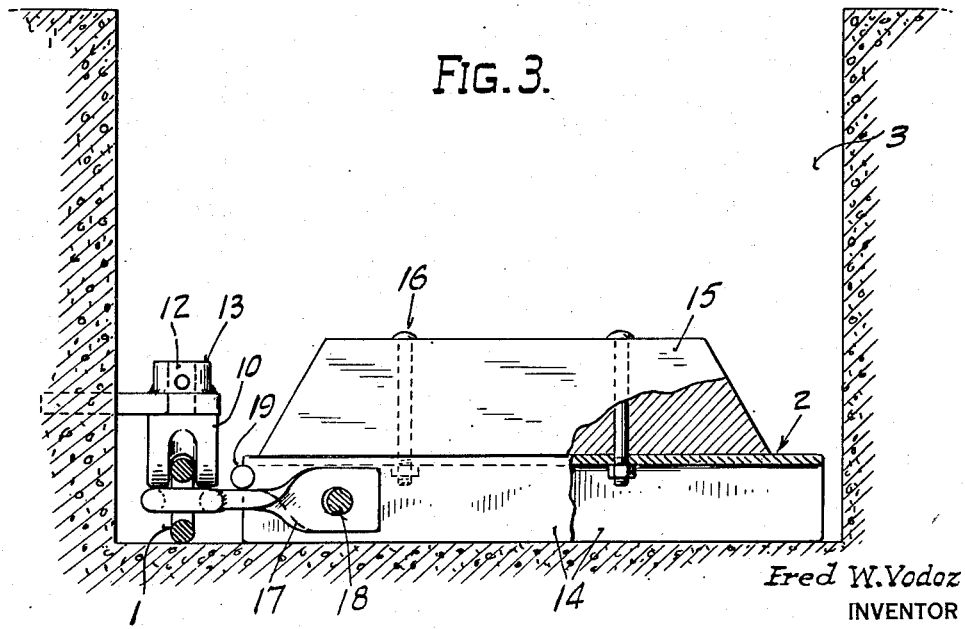

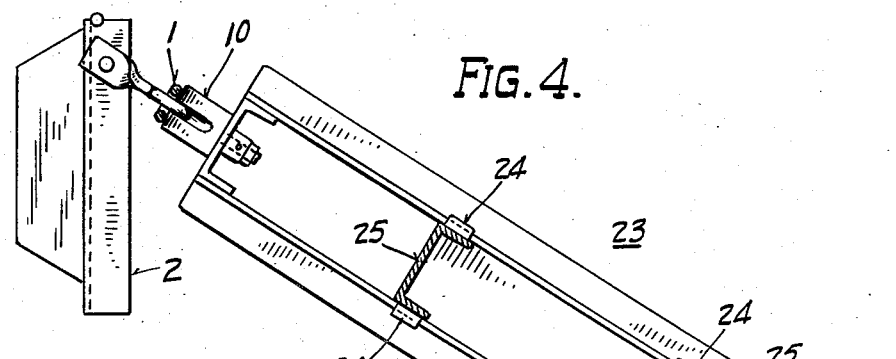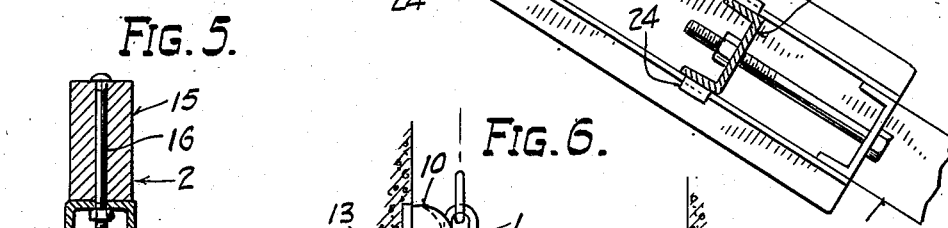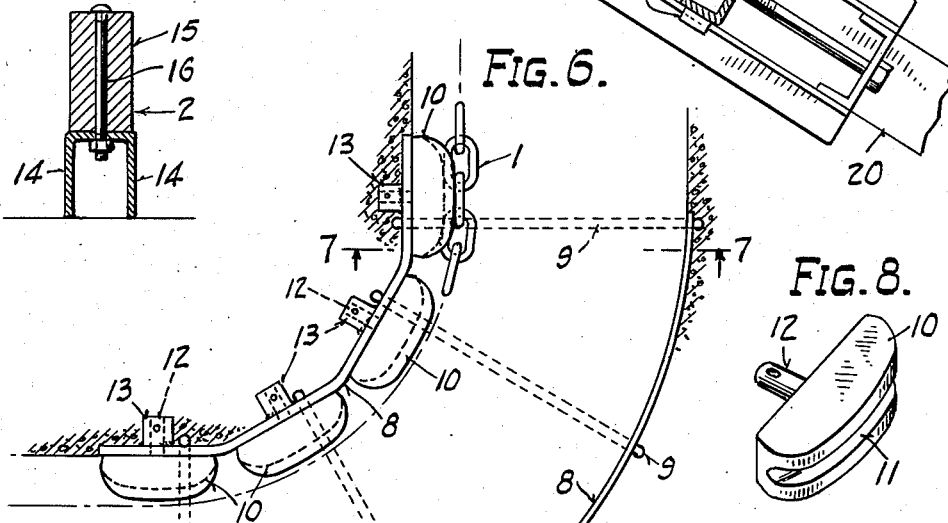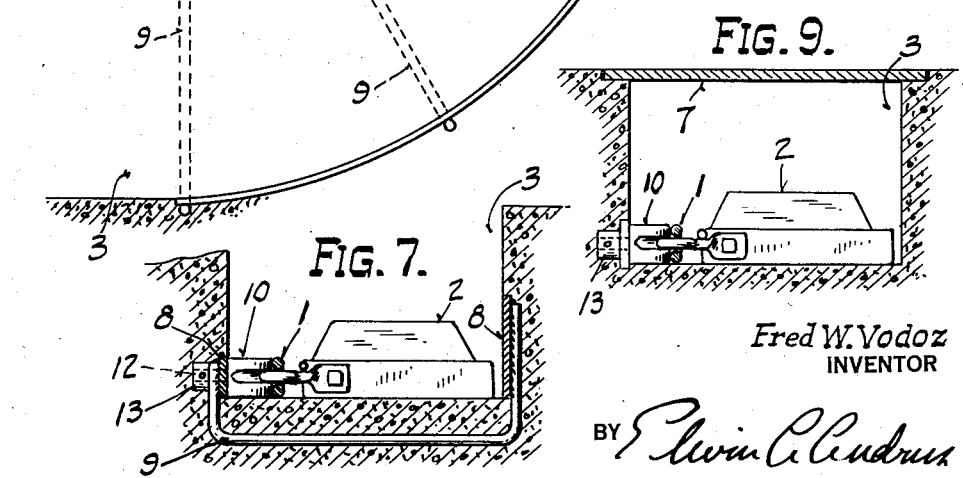

July 21, 1953  F. W. VODOZ  2,646,158
BARN CLEANER
Filed Aug. 18, 1947  7 Sheets-Sheet 4
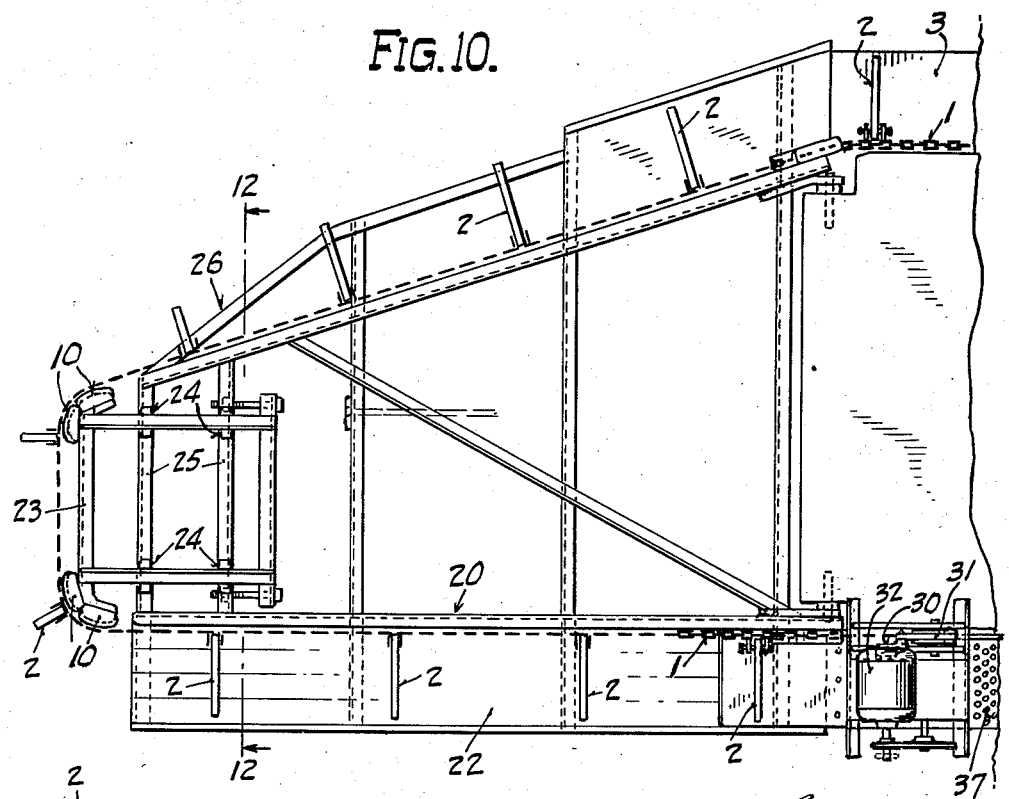
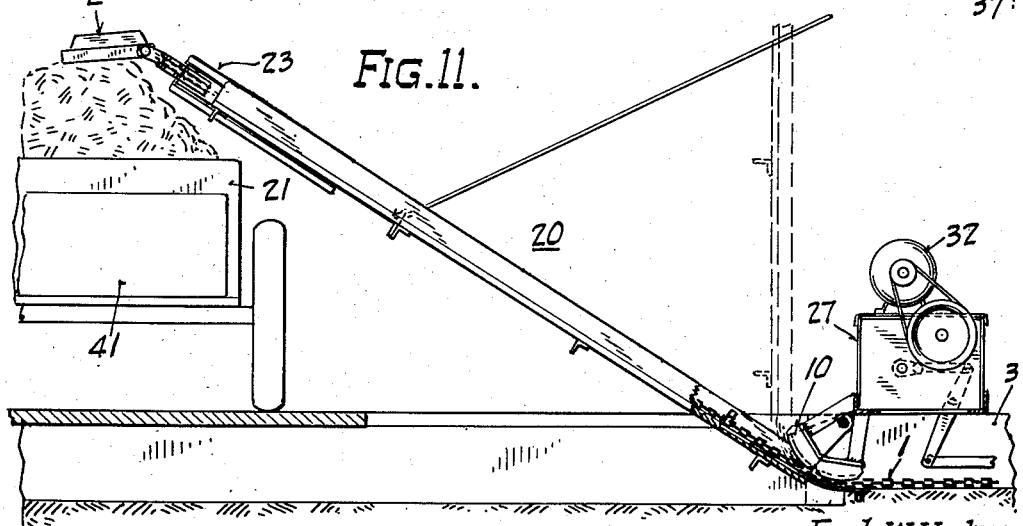
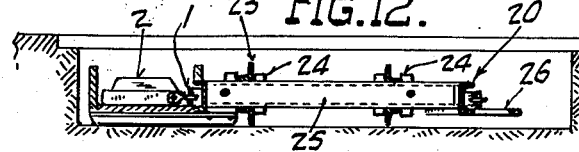
Fred W. Vodoz
INVENTOR
ATTORNEY

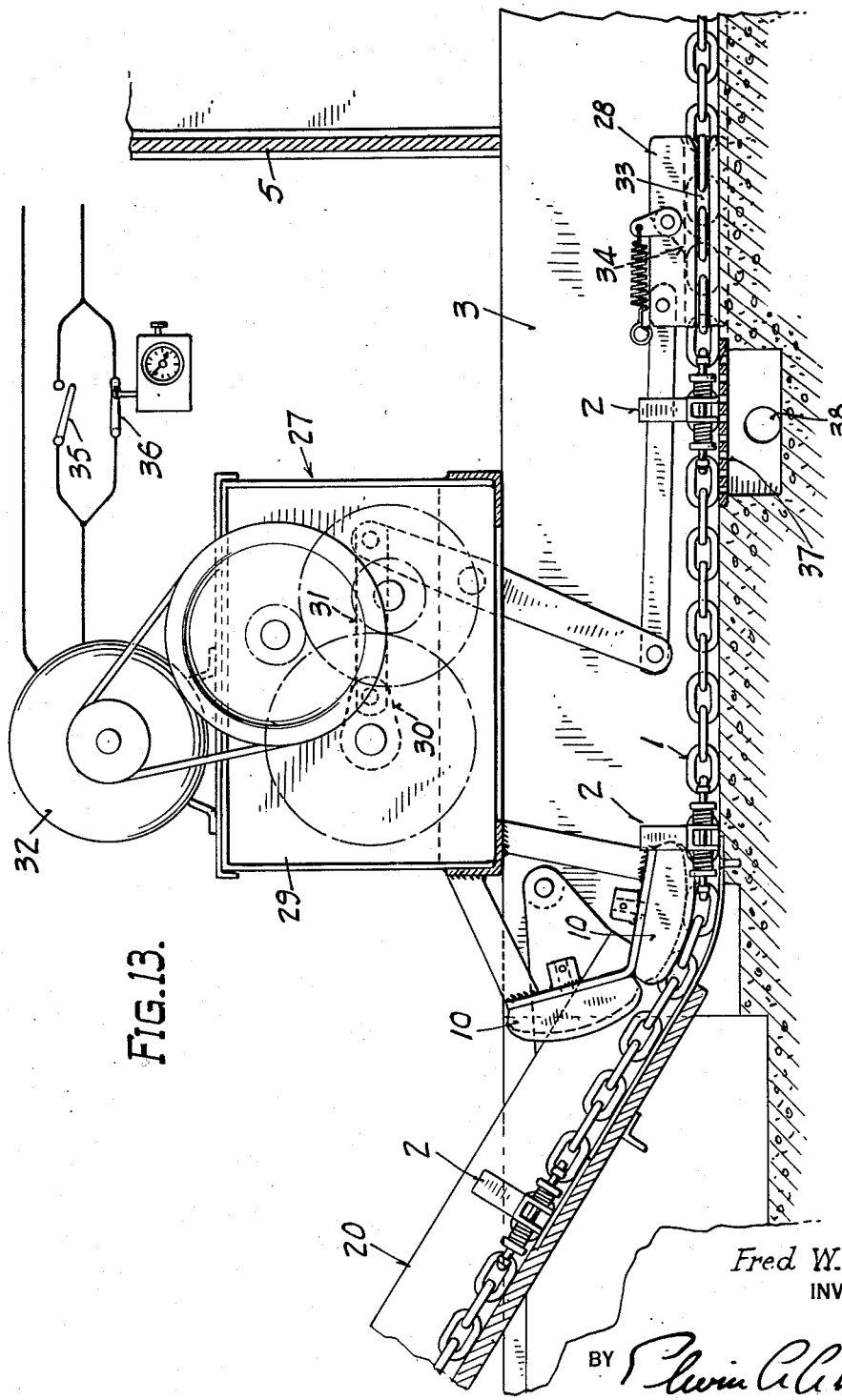

July 21, 1953 F. W. VODOZ 2,646,158
BARN CLEANER
Filed Aug. 18, 1947 7 Sheets-Sheet 6
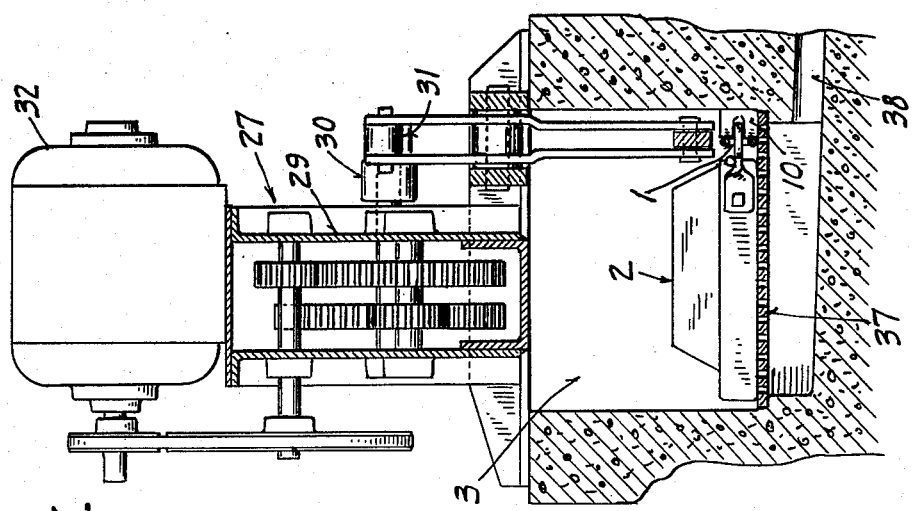
FIG.15.
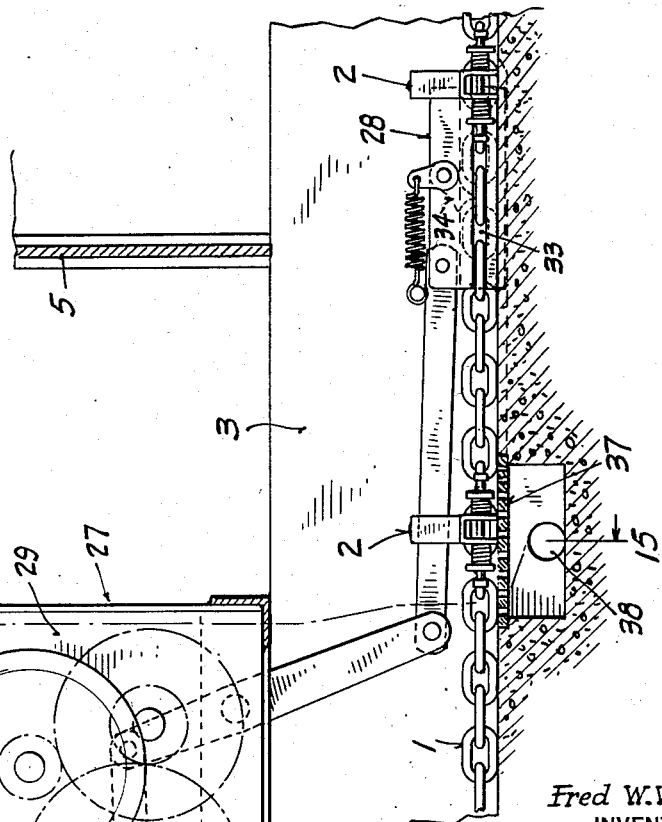
FIG.14.
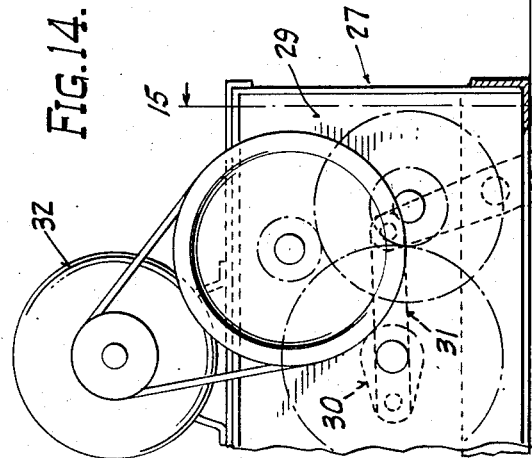
Fred W. Vodoz
INVENTOR
BY
ATTORNEY July 21, 1953 F. W. VODOZ 2,646,158
BARN CLEANER
Filed Aug. 18, 1947 7 Sheets-Sheet 7
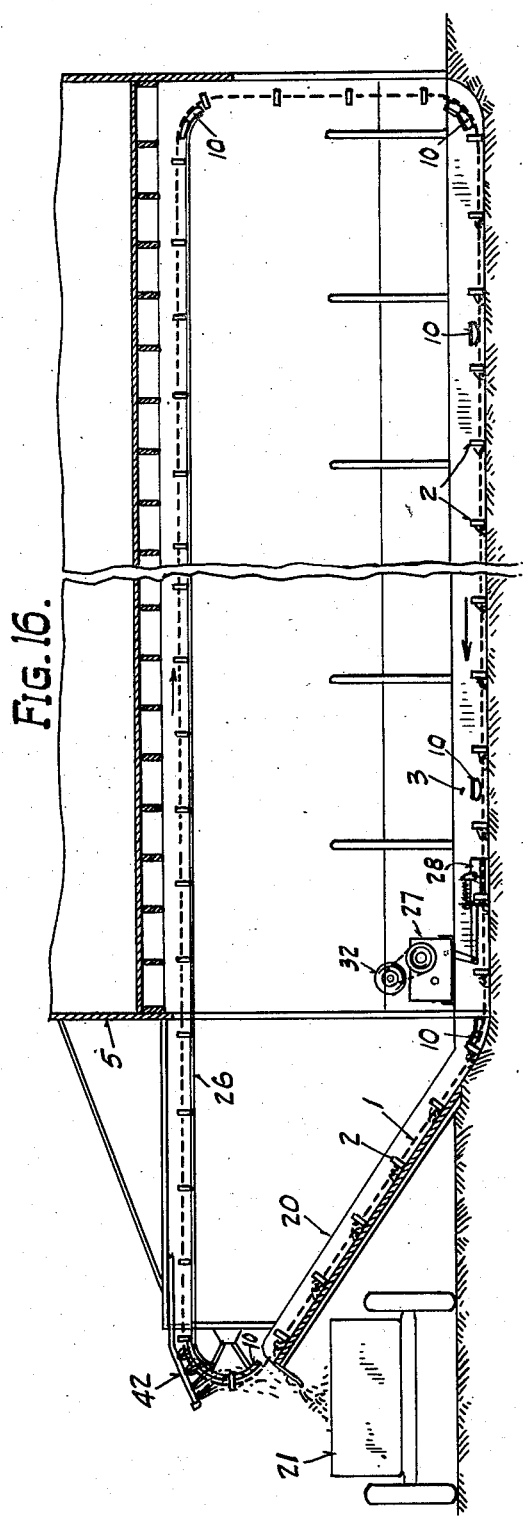
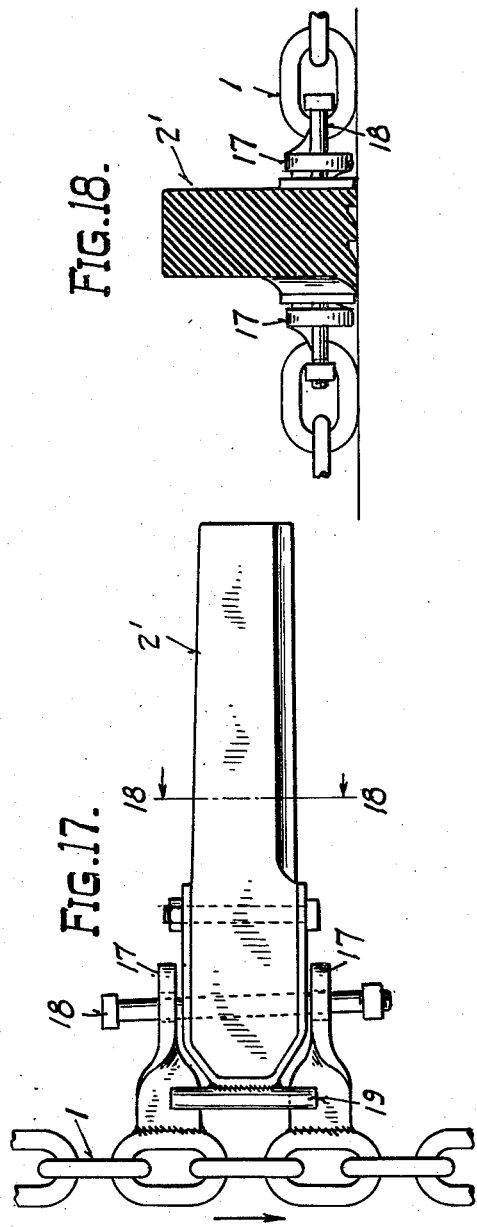
Fred W. Vodoz
INVENTOR
BY
ATTORNEY Patented July 21, 1953

2,646,158

UNITED STATES PATENT OFFICE 2,646,158

BARN CLEANER

Fred W. Vodoz, Wilmette, Ill.

Application August 18, 1947, Serial No. 769,296

8 Claims. (Cl. 198—170)

This invention relates to a dairy barn cleaner for automatically removing the manure and waste from gutters disposed behind rows of dairy cows in a barn.

The cleaner is of the non-portable type adapted to provide a conveyor-like impeller in the trench and to move the manure longitudinally out of one end of the gutter or trench and, if desired, to load the same into a spreader for taking to the field, or into a pile.

One of the principal objects of the invention is to provide a barn cleaner which is simple and substantially less costly than previous cleaners, thereby making the cleaner available for both large and small farms and substantially eliminating a laborious chore.

Another object of the invention is to provide a barn cleaner of the non-portable type which can be more readily installed and maintained by the average farmer.

Another object is to provide a cleaner in which the impellers move in such a manner as to enable cows to remove their feet from the gutter without losing their balance, thereby providing greater safety for the cows.

Another object is to provide a cleaner which cannot injure the cows and which is quiet in operation and does not effect nervousness of the cows.

Another object is to provide a simple positive power drive unit for the cleaner.

Another object is to provide a cleaner which may be made to separate the liquid from the solid material so that they may be disposed of separately.

Another object is to provide means operative in conjunction with the cleaner for removing the liquid material from the trench.

Another object is to provide a cleaner adapted for both double and single run installations and which will transfer the material around bends from one gutter to another.

Another object is to provide a cleaner which may be kept clean by automatic washing as the same is in operation, and with which the gutters may be readily flushed where desired.

Another object is to provide an automatic control for the cleaner, where desired.

Another object is to provide a cleaner which will lift the solid material and automatically load the same in a wagon or spreader or onto a pile.

Another object is to provide a cleaner which will automatically spread the solid material as it dumps the same into a wagon or spreader or onto a pile.

Another object is to provide an endless conveyor type of cleaner with a boom for raising and lowering one section thereof for dumping purposes.

Another object is to provide a more efficient conveyor-impeller structure which may be driven positively and which is less apt to wear and break or to catch and clog.

Another object is to provide an articulated mounting between the impellers and the chain to facilitate dumping and enable the conveyor structure to pass curves.

Another object is to provide means for holding the impellers against the bottom of the gutter and prevent the impellers from riding over the material to be removed.

Another object is to prevent twisting of the chain in operation.

Another object is to provide a cleaner impeller structure capable of running under a driveway or the like between two gutters without danger of clogging.

Another object is to provide means at corners for guiding the impellers without the use of sprockets and the like.

Another object is to provide a cleaner made up of standardized component parts which can be repaired or replaced readily by most any farmer without requiring the services of an expert and which may be assembled to meet variable operating conditions for different barns.

Another object is to provide a simple cleaner conveyor which can be removed readily from the gutter to permit cleaning by manual methods in case of interruption of power, and again replaced in the gutter without difficulty.

Another object is to provide a simple unitary conveyor driving means that can be used singly or in combination with one or more similar drive units to accommodate installations of different lengths, and which may be placed over the gutter at any suitable location along its course.

Another object is to avoid the use of sprocket drives and to provide a drive for the conveyor which may be either intermittent or continuous and which is operable regardless of wear, change in length, or wide tolerance dimensions of the chain conveyor.

The invention has been embodied in the barn cleaner illustrated in the accompanying drawings in which:

Fig. 2 is a detail plan view of a section of the conveyor showing one impeller;

Fig. 3 is a transverse vertical section taken on line 3—3 of Fig. 2;

Fig. 4 is a vertical section taken on line 4—4 of Fig. 1 showing the hanging of the impeller from the chain during dumping and the chain tightening mechanism;

Fig. 5 is a transverse vertical section taken on line 5—5 of Fig. 2 across the impeller blade;

Fig. 6 is a detail plan view of a corner guide structure;

Fig. 7 is a transverse vertical section taken on line 7—7 of Fig. 6 and showing the chain and guide structure;

Fig. 8 is a perspective view of a guide shoe;

Fig. 9 is a transverse section taken on line 9—9 of Fig. 1 across the passage beneath the driveway at one end of the barn for connecting one gutter with the other;

Fig. 10 is a detail enlarged plan view of the boom unloading end of the cleaner;

Fig. 11 is a side elevation of the boom in unloading position;

Fig. 12 is a vertical transverse section taken on line 12—12 of Fig. 10 with the boom lowered in a ditch in inoperative position;

Fig. 13 is a side elevation showing the drive unit in a drive stroke position;

Fig. 14 is a view similar to Fig. 13 showing the drive unit in a return stroke position;

Fig. 15 is a transverse vertical section of the drive unit taken on line 15—15 of Fig. 14;

Fig. 16 is a schematic illustration of an installation for a single length of gutter;

Fig. 17 is a plan view of a molded blade construction for the impellers; and

Fig. 18 is a transverse section taken on line 18—18 of Fig. 17.

Figure 1:
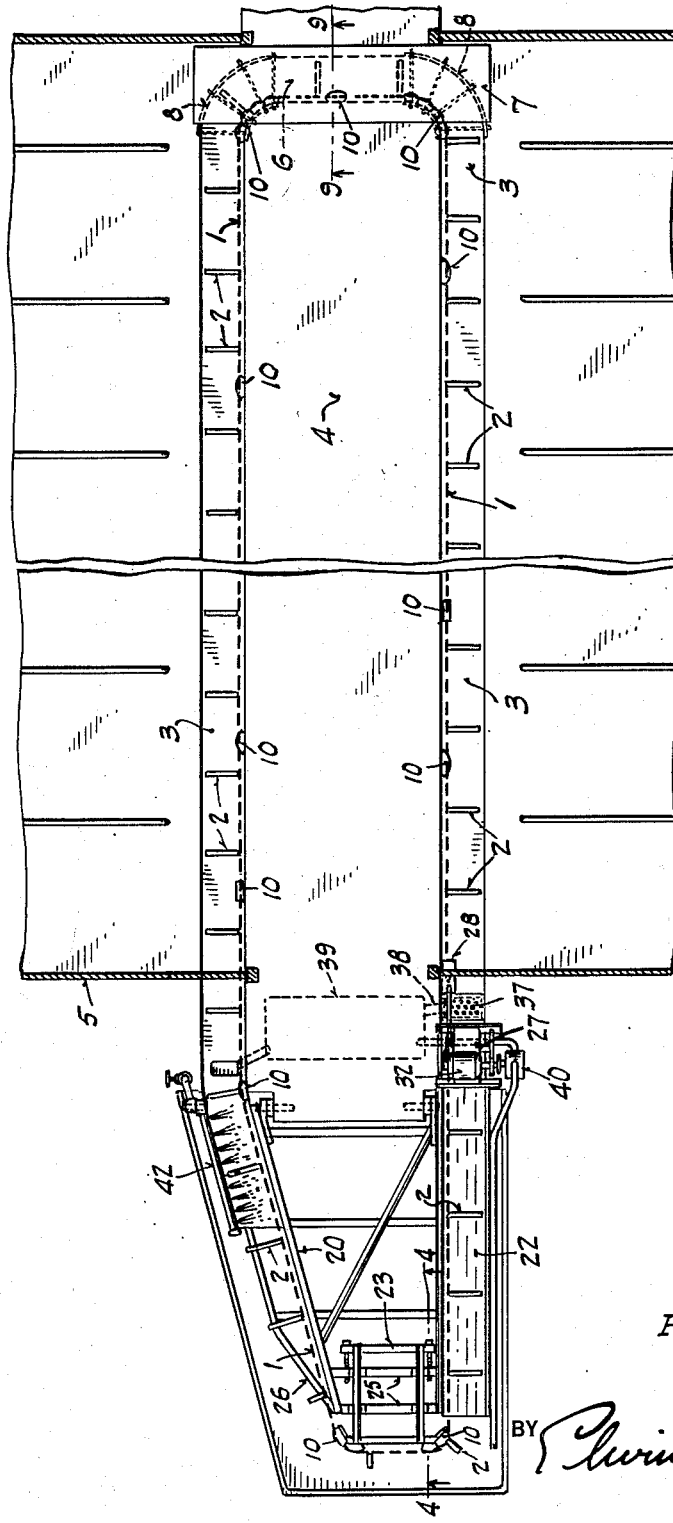
Figure 1 is a reduced scale schematic plan layout of the cleaner.

The barn cleaner employs a single endless common coil link chain 1 as the conveyor element, and a plurality of spaced scrapers or impellers 2 secured to the chain and extending substantially at right angles thereto.

The chain 1 and impellers 2 lie in the bottom of the rectangular manure gutter 3 behind a row of cows with the chain preferably located in the lower corner of the gutter farthest from the cows and the impellers extending horizontally across the bottom of the gutter to scrape the bottom surface clean of manure as the impellers are moved bodily along the gutter by the chain.

In the construction illustrated in Figure 1 there are two parallel gutters 3 spaced apart by a driveway 4 extending through the barn 5.

The gutters 3 are connected at one end of the barn 5 by a cross trench 6 which is covered by a flooring slab 7 to continue the driveway across the same. The corners between gutters 3 and trench 6 are curved on a gradual radius to provide for articulation of the chain around the same without binding of the impellers against the opposite wall of the gutter. For this purpose the gutter curvature should be on a radius substantially greater than the arc of the outer end of an impeller when loosely pivoting from side to side in its mounting.

If desired metal liner sheets 8 may be secured to the side walls of the gutter at the corners and have reinforcing U-shaped members 9. The sheets 8 should be embedded flush with the side walls of the gutter. The outer sheet 8 is curved, while the inner sheet 8 is formed in straight sections adapted to receive suitable guide shoes 10.

The chain 1 is guided at the corners by the standard curved guide shoes 10 which have a channel 11 in their outer curved face for receiving one side of alternate links of the chain. At a right angle turn four shoes are shown in series, each providing a part of the required curvature, and each having a lug 12 extending through inner sheet 8 and into a metallic seat 13 which is welded to the sheet and embedded in the concrete flooring of the barn.

The impellers 2 may be constructed of metal, of wood or of compositions such as rubber and various synthetics and resins. In general the blade section of each impeller should be of substantial height, at least equal to about one-third of the depth of the gutter, and may be tapered off at the ends to avoid catching and possible pinching of a cow's foot or tail between the impeller and the gutter wall.

In the construction shown in Fig. 5 each impeller 2 comprises a metal channel strip extending across the gutter 3 with its flanges 14 downward. A wooden block 15 rests on the web of the channel and extends upwardly to provide the desired height for the impeller. The block 15 is secured to the channel by suitable vertical bolts 16 extending therethrough.

The inner end of the impeller channel is secured between two outward brackets 17 by means of a horizontal bolt 18 extending through the flanges of the channel at a position substantially outward from the inner end of the channel. A cross member 19 on the web of the channel at the inner end is adapted to engage the brackets 17 on opposite sides of the channel and prevent upward tilting of the impeller should it tend to ride over the material in the gutter.

Additional shoes 10 may be spaced along the wall of the gutter facing downwardly to hold the chain down against any tendency to rise in case waste material gets under the chain.

Each bracket 17 is welded to the corresponding side of a horizontally disposed link of chain 1, there being a vertically disposed link of the chain between the two horizontal links that support a pair of brackets.

The bolt 18 is of a length adapted to accommodate a predetermined separation for brackets 17 as on a curve, and should fit loosely in the holes through the brackets to enable the latter to tilt relative to each other on a curve without binding on the bolt. The bolt 18 may fit reasonably tight in the channel of impeller 2 and may be secured to the channel to serve as a trunnion mounting therefor.

The impellers 2 rest on the bottom of the gutter and extend generally horizontally from chain 1. For the purpose of unloading the impellers are allowed to swing downwardly by pivoting on bolts 18 as shown in Figs. 4 and 11.

The boom 20 for loading the manure and waste material from the gutter 3 into a spreader 21 or wagon or onto a pile, comprises a frame disposed to extend upwardly at an incline from the end of barn 5 opposite to trench 6.

The boom 20 may be pivoted at its lower end adjacent the barn for raising of the boom to a substantially vertical position in a small housing therefor encircling the driveway door for the barn, or lowered to a horizontal position in a ditch which may be covered, when the cleaner is not in use.

The boom 20 embodies an inclined replica of gutter 3 comprising a wooden extension 22 for the gutter on the side receiving the material.

The chain 1 and impellers 2 travel upwardly from gutter 3 along the inclined bottom of extension 22 carrying the waste material between the impellers.

The upper end of the boom 20 is positioned over the spreader 21 so that as each impeller pushes the waste material ahead of it over the top end of extension 22 the waste falls into the spreader and the impeller pivots downwardly.

The outer end of the boom 20 extends horizontally across the position of driveway 4 along the length of spreader 21.

The chain 1 is carried across the outer end of the boom by an adjustable head 23 constituting a rectangular frame of angle iron or other suitable construction mounted to slide in ways 24 on two spaced cross beams 25 of the boom. The head 23 has a plurality of corner guide shoes 10 for chain 1 and serves to effect tightening of the chain by adjustment of the head to different selective positions where it may be bolted to the cross beams 25.

The return path for chain 1 down the side of boom 20 opposite gutter extension 22 has a cam 26 consisting of an angle iron strut spaced outwardly from the position of the chain and which engages the impellers 2 and lifts them to horizontal position for entering the return gutter 3 as they reach the bottom of the boom.

During the loading of spreader 21, where the load piles up in one end of the spreader beneath the outer end of extension 22, the impellers 2 serve to scrape the same toward the empty end of the spreader until the spreader is filled evenly from end to end. The same leveling process occurs where the waste material is loaded in a wagon or on a pile.

The chain 1 is driven by a reciprocating pusher unit 27 which may be disposed at any convenient location in the chain circuit. In the illustration shown the drive unit 27 is disposed at the end of trench 3 near to the lower end of extension 22.

The drive unit 27 comprises a pusher block 28 disposed in the bottom of trench 3, a gear housing 29 secured to the barn floor and having a crank 30 with a connecting rod and link 31 for driving the block 28, and a motor 32 mounted on the housing 29 for driving crank 30 through reduction gearing within the housing.

The pusher block 28 has a guide slot 33 therein for receiving the several sides of the chain links as the latter pass longitudinally therethrough. The entrance to slot 33 is tapered for receiving the chain.

The block 28 is made to reciprocate longitudinally of the chain by crank 30 through connecting rod and link 31 and it has a pivotally mounted pusher pawl 34 which engages a vertically disposed link of the chain to move the chain with the block in one direction and which rides over the chain links without moving the chain during the return stroke of the block 28.

The speed of movement of the chain and the distance of travel at each reciprocation are not critical. In the construction illustrated the chain had an effective movement totaling over ten feet per minute with an intermittent stroke of about eight inches.

The chain is relatively free of wear as it passes through the drive unit. The crank drive gives a gradual acceleration and deceleration for the chain.

Tolerances in the construction of the chain are not critical since the pusher pawl will drop into position at the end of any link without regard to the exact position of the link.

The intermittent movement for chain 1 and impellers 2 is more effective in scraping the gutter clean than continuous movement would be. However, for long double gutters it may be advisable to employ a continuous movement for the chain. This can be done by employing two cranks 30 with corresponding connecting rods, links 31 and pusher blocks 28 operating alternately on the chain. It is also possible to employ two or more drive units 27 positioned at any convenient location and operating in synchronism with each other either simultaneously to produce intermittent movement of the chain or alternately to produce continuous movement of the chain.

The motor 32 may be controlled by the usual manual switch 35, and where it is desired to have fully automatic control, a timer switch 36 operated by a manually set clock mechanism may be employed to start the cleaning operation at a certain time and to stop it after a predetermined period of operation.

The barn cleaner is effective for flushing the gutter 3 by the usual water hose and serves to scrape the gutter during the flushing operation. The water, and also liquid waste may be drained through screen 37 in the bottom of trench 3 adjacent the lower end of extension 22, and flows through passage 38 to a sump 39 beneath the barn floor. This liquid, which is considered by some to be most valuable for fertilizer purposes, may be pumped out of the sump 39 by pump 40 and into a tank 41 provided on spreader 21. Pump 40 may be driven by motor 32 or by a separate motor, as desired.

The cleaner conveyor may be washed by a spray mechanism 42 disposed on the return side of boom 20 and which may drain into sump 39. Where a watertight spreader 21 is employed the spray 42 may be disposed to flush the chain 1 and impellers 2 above the spreader so that the spray drains into the spreader.

Where only a single length of gutter 3 is present, the return path for chain 1 may be disposed at any convenient location as illustrated in Fig. 16 where the chain 1 returns along the ceiling of the barn. In this event the cam 26 may extend for the length of the return course to hold the impellers out of the way and to control positioning of the same in the gutter.

The impeller construction shown in Figs. 17 and 18 is of molded rubber and the impeller blade 2' may be of channel shape and have its forward side extend on a slant to better scrape the bottom of the gutter. The blade 2' in this construction is integral throughout and does not have the separate wood block 15 of the construction shown in Fig. 5.

Various embodiments of the invention may be employed within the scope of the accompanying claims.

I claim:

1. A non-portable cleaner for removing manure and waste from the gutter of a dairy barn floor, comprising a single endless coil chain disposed to travel in one portion of its course along the bottom of the gutter, a plurality of spaced impellers each pivotally secured to at least two spaced corresponding links of said chain and adapted to extend substantially transversely of the gutter and across the bottom thereof, said chain and impellers constituting a conveyor system having an unloading station at one location in its course of travel, the pivotal connection between each said impeller and said chain having an axis parallel to the longitudinal course of said chain to provide for downward tilting of the impeller at the unloading station, means preventing upward tilting of the impellers in the gutter to effect scraping of the bottom of the gutter by the impellers, and means to drive the chain to effect cleaning of the gutter.

2. A non-portable cleaner for removing manure and waste from the gutters of a dairy barn floor in which two separate gutters are joined by a curved section of trench, comprising a single endless coil chain disposed to travel in one portion of its course along the bottom of said gutters and through said curved trench section with said chain disposed adjacent the side of the gutters corresponding to the inner side of said curved trench section, a plurality of spaced impellers each hinged to at least two spaced corresponding links of said chain to extend transversely across the bottom of the respective gutter from the chain and to scrape the bottom of the gutters as they travel therealong with said chain, said chain and impellers constituting a conveyor system having an unloading station at one location in its course of travel, the pivotal connection between each said impeller and said chain having an axis parallel to the longitudinal course of said chain to provide for downward tilting of the impeller at the unloading station, means preventing upward tilting of the impellers in the gutter to effect scraping of the bottom of the gutter by the impellers, and means to drive the chain to effect cleaning of the gutters.

3. A non-portable cleaner for removing manure and waste from the gutter of a dairy barn floor, comprising a single endless coil chain disposed to travel in one portion of its course along the bottom of the gutter, a plurality of spaced impellers each pivotally secured to at least two spaced corresponding links of said chain and adapted to extend substantially transversely of the gutter and across the bottom thereof, said chain and impellers constituting a conveyor system and having an unloading station at one location in its course of travel, the pivotal connection between each said impeller and said chain having an axis parallel to the longitudinal course of said chain to provide for downward tilting of the impeller at the unloading station, means preventing upward tilting of the impellers in the gutter to effect scraping of the bottom of the gutter by the impellers, means to raise said impellers in succession to horizontal position after passing said unloading station, and means to drive the chain to effect cleaning of the gutter.

4. A non-portable cleaner for removing manure and waste from the gutters of a diary barn floor in which two separate gutters are joined by a curved section of trench, comprising a single endless coil chain disposed to travel in one portion of its course along the bottom of said gutters and through said curved trench section with said chain disposed adjacent the side of the gutters corresponding to the inner side of said curved trench section, a plurality of spaced impellers secured to horizontal links of said chain to extend transversely across the bottom of the respective gutter from the chain and to scrape the bottom of the gutters as they travel therealong with said chain, said chain and impellers constituting a conveyor system having unloading station at one location in its course of travel, removable channel guide shoes secured in the gutter at the curves therein and having recesses therein for receiving the vertically disposed links of the chain and guiding the chain in its movement, said channel guide shoes being opened outwardly for passing said links as the chain passes through the shoes, and means to drive the chain to effect cleaning of the gutters.

5. In a barn cleaner of the class described, a single chain endless conveyor having transverse impellers extending laterally from one side of the chain for pushing manure and waste along a gutter in the floor of a barn, means at the discharge end of the gutter simulating an inclined extension of the gutter, said conveyor being disposed to move upwardly along the inclined bottom of said means and to turn generally horizontally at an angle thereto at the upper end of said means, and means pivotally suspending the impellers from the chain on a substantially horizontal axis substantially parallel to the axis of the chain, and the bottom of the upper end of said inclined extension terminating at said turn to provide for gravitational dropping of said impellers and their load, thereby discharging said conveyor as the impellers successively reach the upper end of said first-named means, to thereby progressively dispose of the manure and waste from the gutter.

6. In a barn cleaner of the class described, a single chain endless conveyor having transverse impellers extending laterally from one side of the chain for pushing manure and waste along a gutter in the floor of a barn, means at the discharge end of the gutter simulating an inclined extension of the gutter, said conveyor being disposed to move upwardly along the inclined bottom of said means and to turn generally horizontally at an angle thereto at the upper end of said means, and means pivotally suspending the impellers from the chain on a substantially horizontal axis substantially parallel to the axis of the chain, and the bottom of the upper end of said inclined extension terminating at said turn to provide for gravitational dropping of said impellers and their load, thereby discharging said conveyor as the impellers successively reach the upper end of said first-named means, to thereby progressively dispose of the manure and waste from the gutter, said impellers being adapted to move with the chain and effect leveling of the manure and waste as the same is discharged from the cleaner.

7. In a cow barn or the like having a multiple course gutter for manure disposed behind the cow stanchions, a power cleaner for removing manure and waste from the gutter, comprising a common endless coil chain having wide tolerances in coil dimensions and disposed in the bottom of the gutter along one side thereof with alternate links disposed vertically and horizontally, respectively, a plurality of spaced impeller flights secured to said chain and extending across the gutter to scrape the bottom of the latter as the chain moves forwardly in one direction, said flights being secured to one side of horizontal links of said chain, stationary guide shoes disposed at bends in the course of said chain and having a longitudinally extending channel therein adapted to receive the opposite side of the horizontal links and also the vertical links of the chain to guide the chain on said bends, the open side of said channel in said guide shoes being adapted to pass said impellers as the chain passes through the shoe, and a reciprocating ratchet drive for said chain.

8. In a cow barn or the like having a multiple course gutter for manure disposed behind the cow stanchions, a power cleaner for removing manure and waste from the gutter, comprising a common endless coil chain having wide tolerances in coil dimensions and disposed in the bottom of the gutter along one side thereof with alternate links disposed vertically and horizontally, respectively, a plurality of spaced impeller flights secured to said chain and extending across the gutter to scrape the bottom of the latter as the chain moves forwardly in one direction, said flights being secured to one side of horizontal links of said chain, stationary guide shoes disposed at a bend in the course of said chain and having a longitudinally extending channel therein adapted to receive the vertical links of the chain to guide the same on the bend, the open side of said channel in said guide shoes being adapted to pass said impellers as the chain passes through the shoe, and a reciprocating ratchet drive for said chain.

FRED W. VODOZ.

References Cited in the file of this patent

UNITED STATES PATENTS

| Number | Name | Date |
|---|---|---|
| 428,675 | Holt | May 27, 1890 |
| 462,417 | Taylor | Nov. 3, 1891 |
| 467,059 | Smith | Jan. 12, 1892 |
| 806,803 | Hamilton | Dec. 12, 1905 |
| 950,975 | Watterson | Mar. 1, 1910 |
| 938,546 | Coleman | Apr. 4, 1911 |
| 1,074,182 | Jorgensen | Sept. 30, 1913 |
| 1,318,390 | Koelling | Oct. 14, 1919 |
| 1,498,725 | Groeler | June 24, 1924 |
| 1,560,680 | Fernandes | Nov. 10, 1925 |
| 1,571,536 | Wilson | Feb. 2, 1926 |
| 1,640,825 | Flintrop | Aug. 30, 1927 |
| 1,728,283 | Fisher | Sept. 17, 1929 |
| 1,800,814 | Boldt | Apr. 14, 1931 |
| 1,845,758 | McDuff | Feb. 16, 1932 |
| 1,906,659 | Talley | May 2, 1933 |
| 2,096,409 | Sayers | Oct. 19, 1937 |
| 2,381,519 | Russell | Aug. 7, 1945 |
| 2,383,932 | Brunner | Sept. 4, 1945 |

FOREIGN PATENTS

| Number | Country | Date |
|---|---|---|
| 30,080 | Denmark | Aug. 14, 1922 |
| 347,828 | Great Britain | May 7, 1931 |
| 672,956 | Germany | Mar. 17, 1939 |
| 101,118 | Sweden | Mar. 18, 1941 |